Oct. 31, 1967 — A. D. ISBELL — 3,350,029
PIVOTED SPINNING REEL
Filed Dec. 22, 1965 — 2 Sheets-Sheet 1

INVENTOR.
AUBREY D. ISBELL
BY
ATTORNEY

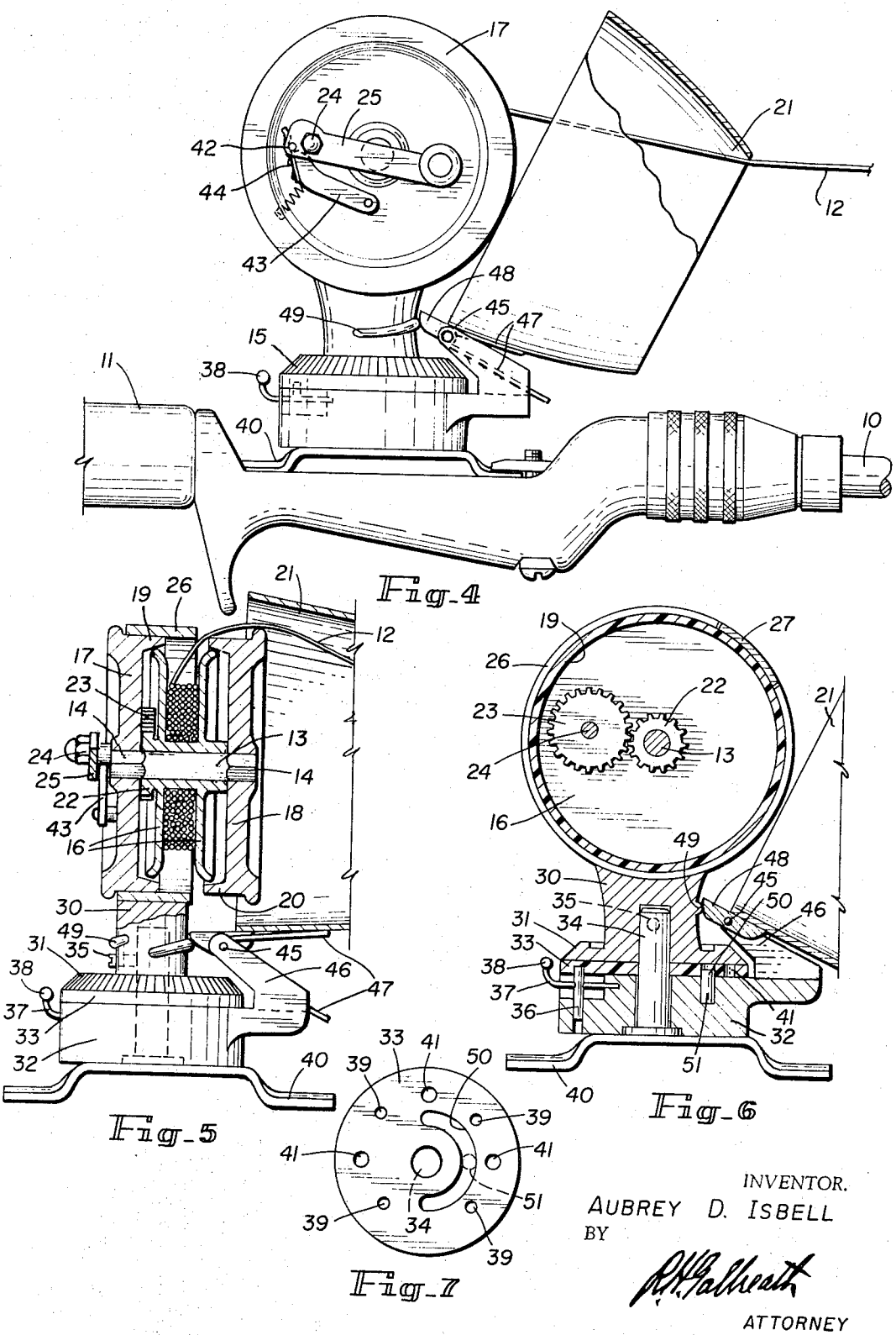

United States Patent Office 3,350,029
Patented Oct. 31, 1967

3,350,029
PIVOTED SPINNING REEL
Aubrey D. Isbell, 1613 Garfield,
Loveland, Colo. 80537
Filed Dec. 22, 1965, Ser. No. 515,673
7 Claims. (Cl. 242—84.2)

This invention relates to what is commonly called a "spinning reel," that is to a reel of the type in which, when a cast is made, the line is drawn in an axial direction from a stationary spool such as shown in applicant's prior Patent No. 3,049,316, Aug. 14, 1962.

One of the principal advantages of a spinning reel is the ease with which the line discharges from the reel since it is not required to rotate the line spool when casting. One of the principal difficulties of a spinning reel, however, is the twist that is imparted to the line. Each spin of the line from the end of the spool places a 360° twist in the line and the twists "build up" until the line becomes so twisted that it must be stretched out and untwisted to prevent entanglement.

The principal object of this invention is to provide a spinning reel by means of which the direction of twist imparted to the line can be alternated so that a twist imparted by a first cast will be unwound by a second cast thus preventing a "build up" of twist in the line.

Another object is to provide a reel which will automatically unwind a line twist by a simple shift of a line spool without the necessity for twist removal devices or attachments and without placing a drag or resistance upon the discharging line.

A further object is to provide a line retrivieving spool so arranged that the line can be alternately and axially spun from the opposite sides of the spool so as to impart alternate and opposite twists to the line when making successive casts.

Other objects and advantages reside in the detail construction of the invention, which is designed for simplicity, economy, and efficiency. These will become more apparent from the following description.

In the following detailed description of the invention, reference is made to the accompanying drawing which forms a part thereof. Like numerals refer to like parts in all views of the drawing and throughout the description.

In the drawing:

FIG. 4 is a side elevational view thereof, partially broken away, showing the reel in the retrieving position of FIG. 2;

FIG. 5 is a longitudinal sectional view taken on the line 5—5, FIG. 3;

FIG. 6 is a similar cross-sectional view taken on the line 6—6, FIG. 2; and

FIG. 7 is a detail bottom view of a friction gasket employed in the invention.

Figure 1:
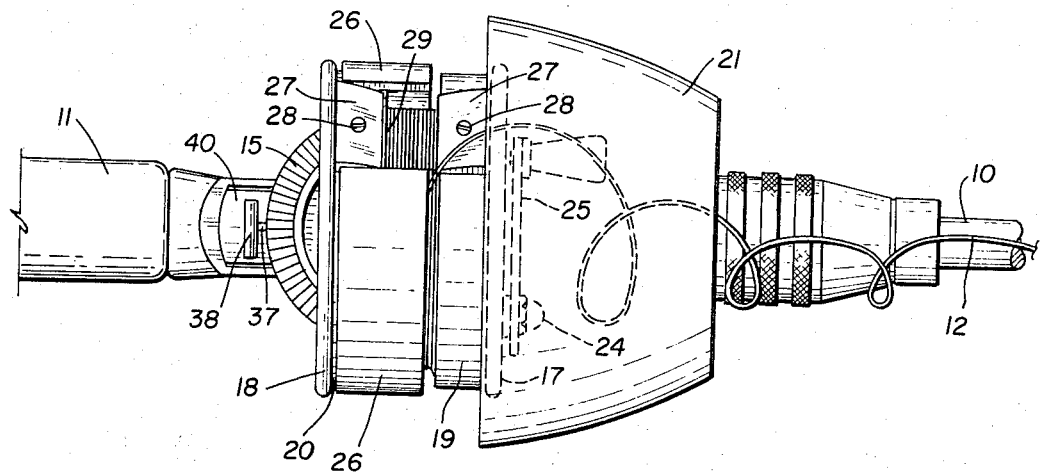
FIG. 1 is a top plan view of the spinning reel of this invention showing it in place upon a rod in what will be herein designated as the "first spinning position"

In the drawing a conventional fishing rod is indicated at 10 with its handle at 11 and fishing line at 12.

Basically, the improved reel comprises a spool element which is horizontally and axially shiftable in a rotatable supporting element so that the line may be alternately spun from opposite sides of the spool element to prevent accumulative twist in the line.

The spool element comprises an axially-positioned shaft having a cylindrical medial portion 13 and two non-round (preferably square) terminal portions 14. The hub of a circular-sided line spool 16 is rotatably mounted on the medial portion 13 and two similar drum discs 17 and 18, preferably formed of molded plastic, are individually pressed, or otherwise fixedly mounted, on the non-round terminal portions 14 of the spool shaft at the opposite sides of the line spool 16 so that the discs and the shaft form an integral unit. Circular drums 19 and 20 are concentrically formed or molded on and extend inwardly from, the drum discs 17 and 18, respectively, into over-lapping relation with the circular sides of the line spool 16.

An axially positioned driven pinion 22 is formed, or mounted, on that side of the line spool 16 which is within the confines of the drum 19. The pinion 22 is constantly in mesh with a drive gear 23 which is mounted on the inner extremity of a crank shaft 24 which extends through and is journalled in the drum disc 17. A line winding crank 25 is fixedly mounted on the outer extremity of the crank shaft 24 for manually rotating the line spool 16 through the medium of the drive gear 23 and the driven pinion 22. The crank 25 is provided with a click pin 42 which engages the extremity of a spring-loaded click lever 43 pivotally mounted on the drum disc 17 to stop counter-clockwise movement of the crank. It is preferred to place a latch spring 44 on the extremity of the click lever 43 to resiliently engage the click pin 42 to releasably hold the crank in the position of FIG. 4.

It can be seen that if the drum discs 17 and 18 and their drums 19 and 20 be prevented from rotating, and, if the crank be manually rotated in a clockwise direction, the spool 16 will be rotated counter-clockwise to retrieve the line thereon. In this invention, the discs are prevented from rotating by means of a circular, resilient, transversally-split ring band 26 which surrounds and alternately frictionally engages the drum 19 or 20. The ring band 26 is of sufficient width so that when either of said drums 19 or 20 is forced fully into, and into the resilient grip of, the band 26, the other drum will be positioned beyond the ring band to expose the line spool so that the line can be spun from the stationary spool 16 about the periphery of the drum disc of said other drum.

The drum discs 17 and 18 are prevented from rotating by means of two inclined key blocks 27, there being one of said key blocks secured to the periphery of each drum in any desired manner such as by means of an attachment screw 28. Each key block corresponds in width to the width of the drum to which it is attached and the two key blocks are circumferentially aligned with each other so that either or both may be forced into the confines of a split or open keyway 29 formed in the circumference of the ring band 26. The spacing between the drums and between the two key blocks is less than the width of the ring band 26 so that each block will enter the keyway 29 before the other block leaves the keyway so as to permanently prevent rotation of the spool assembly in the ring band and yet allow free axial movement thereof.

The ring band 26 is supported on a pedestal block 30 having a circular base flange 31 which is horizontally supported from a reel foot element 32 upon a friction gasket 33. The friction gasket is fixed to the base flange 31 in any desired manner, such as by means of screws 39 so as to rotate therewith as a unit. The reel foot element 32 is mounted on a conventional rod-mounting-yoke 40 arranged for the customary attachment to the handle 11 of the rod 10.

A pivot pin 34 extends upwardly and rotatively through the foot element 32 and through the gasket 33 and is affixed at its upper extremity in the pedestal block 30, such as by means of a suitable set screw 35. Thus, the entire spool assembly may be rotated in a horizontal plane about the vertical axis of the pin 34 from the first spinning position of FIG. 1 to the retrieving position of FIG. 2, thence to the second spinning position of FIG. 3.

The reel assembly can be temporarily locked in any one of the three above positions by means of a latch pin 36 which is vertically slidable in the reel foot element 32 and which is constantly urged upwardly by means of a latch spring 37 provided with a thumb button 38. The latch pin 36 is positioned to successively enter three locating holes 41 in the friction gasket 33 to preset the position of the spool assembly in any of its three operating positions. The spool assembly can be released for rotation by simply depressing the thumb button 38 to withdraw the pin 36 from a locating hole 41. The peripheral edge of the base flange is preferably knurled as shown at 15 so that it may be rotated by the thumb of the user when depressing the unlocking button 38.

Let us assume that an untwisted line is wound on the spool 16 and extends therefrom through the conventional line guides on the rod 10 to the bait or lure. The spool assembly is in the position of FIG. 1 with the drum 20 forced forwardly into the ring band 26 to expose the reeled line. The line extends forwardly from the spool and across the periphery of the drum disc 17. A first cast is now made to cause the line to spin laterally from the spool, the latter being held stationary against the pull of the line by the click lever 43, and about the circular periphery of the disc 17 as indicated in FIG. 1. The cast imparts a twist to the line.

Figure 2:
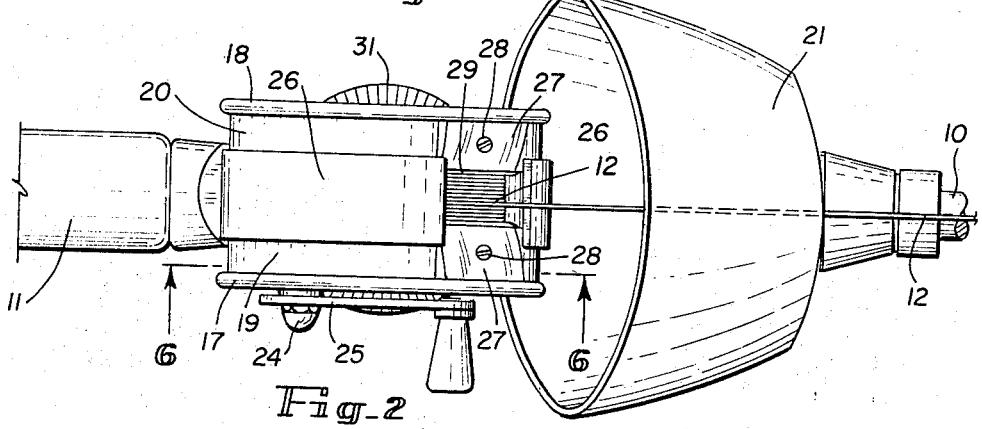
FIG. 2 is a similar view thereof in the "retrieving position"
Figure 3:
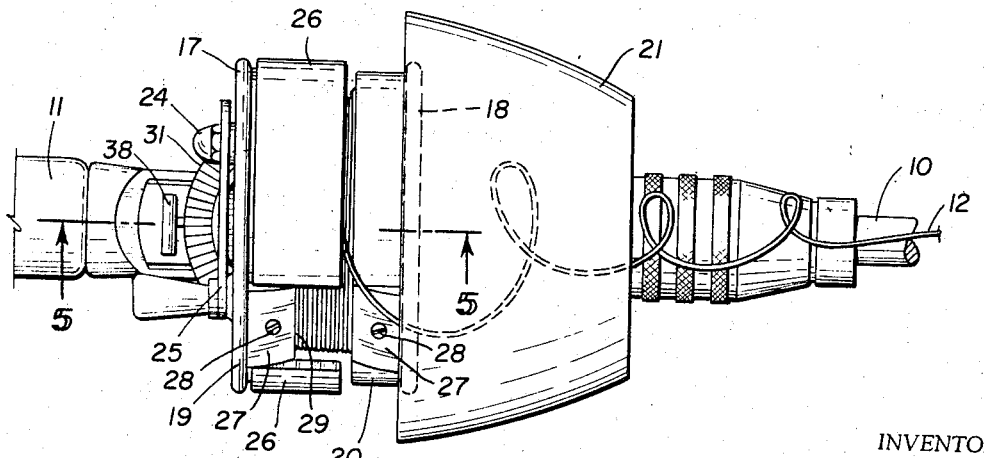
FIG. 3 is a similar view thereof in what will be herein designated as the "second spinning position"

When it is desired to retrieve the line, the thumb button 38 is depressed with the thumb of one hand and the spool assembly is pressed into an intermediate position in the ring band 26 with the other hand so that both drums will frictionally engage the band, as shown in FIG. 2, with the line exiting through the keyway 29 in the band. The spool assembly is simultaneously rotated 90° about the axis of the pivot pin 34 of FIG. 2 to the retrieving position of FIG. 2 and locked by the latch pin. The crank 25 is now rotated clockwise to reel the twisted line on the spool 16.

Now let us assume it is desired to make a second cast. The thumb button is again depressed, to allow the spool assembly to be rotated 90° to the second spinning position of FIG. 3, and the drum 19 is pressed into frictional engagement with the ring band, with the disc 18 extending forwardly therefrom as shown in the latter figure. The second cast is now made and the line will spin from the spool about the circular periphery of the second disc 18 to completely remove the twist imparted by the first cast. The spool assembly is now turned back 180° and shifted to the position of FIG. 1 for the next successive cast. It can be seen, that when the improved reel is used as above described, there can never be more than one twist in the line and a single twist is negligible.

Any of the suitable means as used on conventional spinning reels may be provided for confining the whirls of the spinning line to prevent external entanglement. It is preferred, however, to use a line cup 21, having a large, rear, open end directed toward the reel, and a relatively smaller front, open end for the passage of the line to the rod 10. The cup 21 is hingedly mounted on a hinge pin 45 supported on bracket arms 46 extending from the forward extremity of the reel foot element 32, as shown in FIG. 6. A horseshoe spring 47 is positioned about the pin 45 and constantly and resiliently urges the line cup 21 upwardly toward the spinning positions of FIGS. 1 and 3.

The line cup is automatically moved forwardly and downwardly to the position of FIG. 2, when the line is to be retrieved by means of a cam follower arm 48, which extends rearwardly from the axis of the hinge pin 45, and which is contacted by a cam 49 formed on the pedestal block 30, when the latter is rotated from either spinning position to the retrieving position of FIG. 2. The cam 49 is contoured so as to tilt the line cup 21 away from the reel against the bias of the spring 47 to allow free entrance and exit of the crank 25 to and from the cup 21 as the spool assembly is rotated about the pivot pin 34 and to allow the line to be reached by the hand for "playing" the fish.

Rotation of the spool assembly beyond the two spinning positions is prevented by means of an arc-limiting pin 51 which extends upwardly from the reel foot element 32 into an arcuate limiting slot 50, having a length of 180°, in the friction gasket 33, as shown in FIG. 7.

When casting, the exiting line can be braked, retarded or stopped by pressing the thumb against whichever drum, 19 or 20, over which the line is spinning. The ring band 26 may be notched (not shown) to facilitate, if desired, "thumbing" of the line. While the friction gasket 33 has been illustrated as a separate element attached to the base flange 31, it could, of course, be formed integrally with the pedestal block 30 and its base flange 31.

While a specific form of the invention has been described and illustrated herein, it is to be understood that the same may be varied within the scope of the appended claims, without departing from the spirit of the invention.

Having thus described the invention what is claimed and desired to be secured by Letters Patent is:

1. A spinning reel comprising:
 (a) a line spool positioned between two circular side elements;
 (b) a ring band concentrically encircling and frictionally engaging said side elements;
 (c) a stationary vertical pivot element; and
 (d) a pedestal element carrying said ring band, said pedestal element with said ring band being pivotally mounted upon said pivot element to enable either of said side elements to be positioned forwardly so that a line may be spun forwardly from said spool about either of said circular side elements as desired.

2. A spinning reel as described in claim 1 having a spool shaft extending axially of said spool, said spool being rotatively mounted on the mid-portion of said shaft and said circular side elements being fixedly mounted on the extremities of said shaft, said spool shaft and the elements mounted thereon being axially shiftable in said ring band to position either of said side elements forwardly of said band to provide a circumferential exit from said line.

3. A spinning reel as described in claim 2 having means for locking said pedestal element when either of said side elements is positioned forwardly and when in an intermediate position.

4. A spinning reel as described in claim 3 having interengaging means between said side elements and said ring band to prevent rotation of the former in the latter.

5. A spinning reel as described in claim 4 having:
 (a) a crank shaft journalled in one of said side elements parallel to and eccentric of said spool shaft;
 (b) means for transmitting rotation from said crank shaft to said spool; and
 (c) means for rotating said crank shaft.

6. A spinning reel as described in claim 2 having:
(a) a reel foot element, in which said vertical pivot element is mounted, frictionally supporting said pedestal element; and
(b) a line cup hingedly mounted on said reel foot element forwardly of said spool through which said line passes and in which said line spins as it exits over the forwardly positioned side element.

7. A spinning reel as described in claim 6 having cam means interposed between said pedestal element and said line cup acting to hingedly raise and lower said line cup in consequence of rotation of said pedestal element on said reel foot element.

References Cited

UNITED STATES PATENTS

| 2,283,773 | 5/1942 | Teitsma | 242—84.2 X |
| 2,581,306 | 1/1952 | Slotterback | 242—84.2 |
| 2,744,693 | 5/1956 | Albert | 242—84.2 |

FOREIGN PATENTS 931,812   11/1947   France.

FRANK J. COHEN, *Primary Examiner.*

BILLY S. TAYLOR, *Examiner.*